Patented Feb. 17, 1948

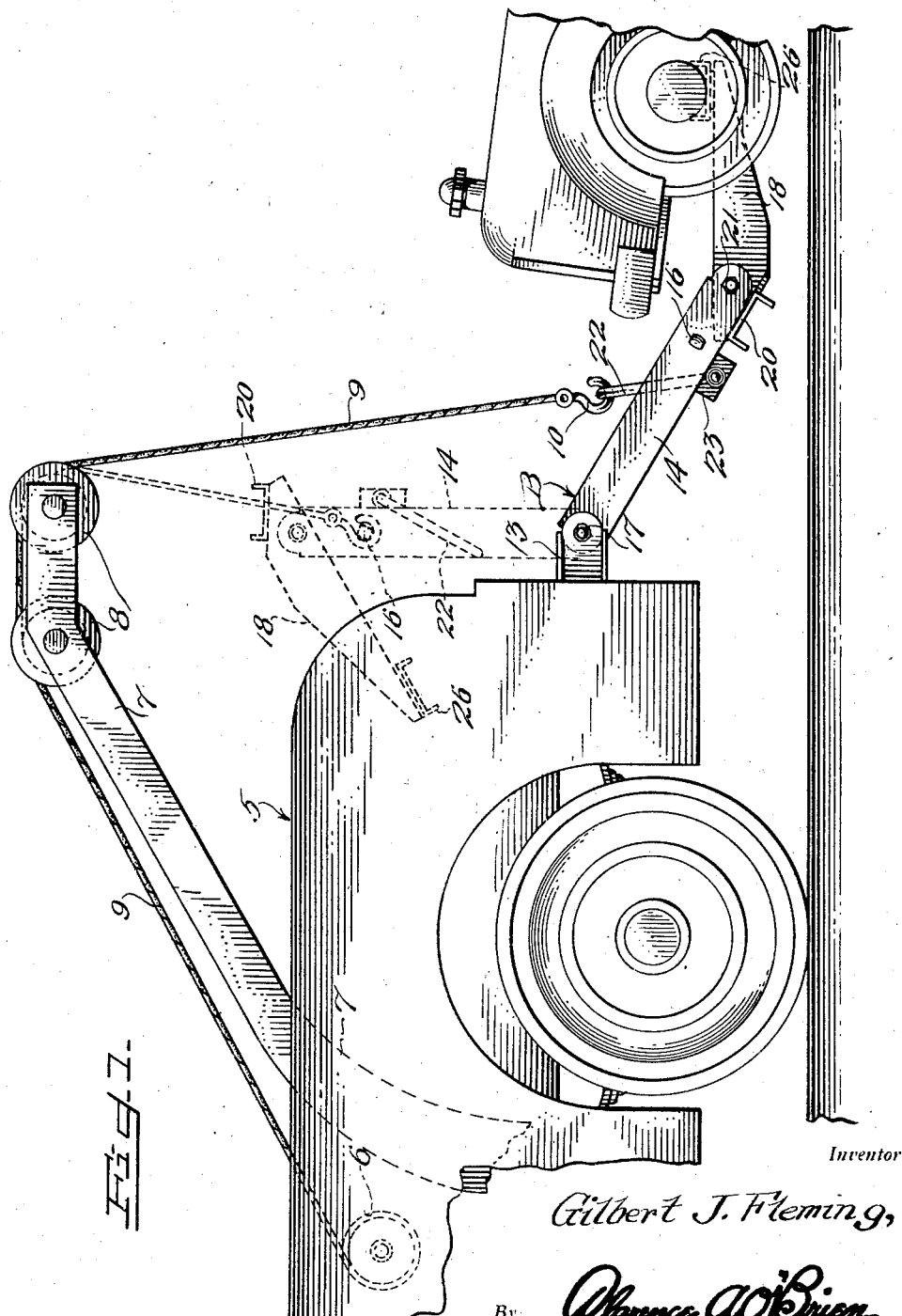

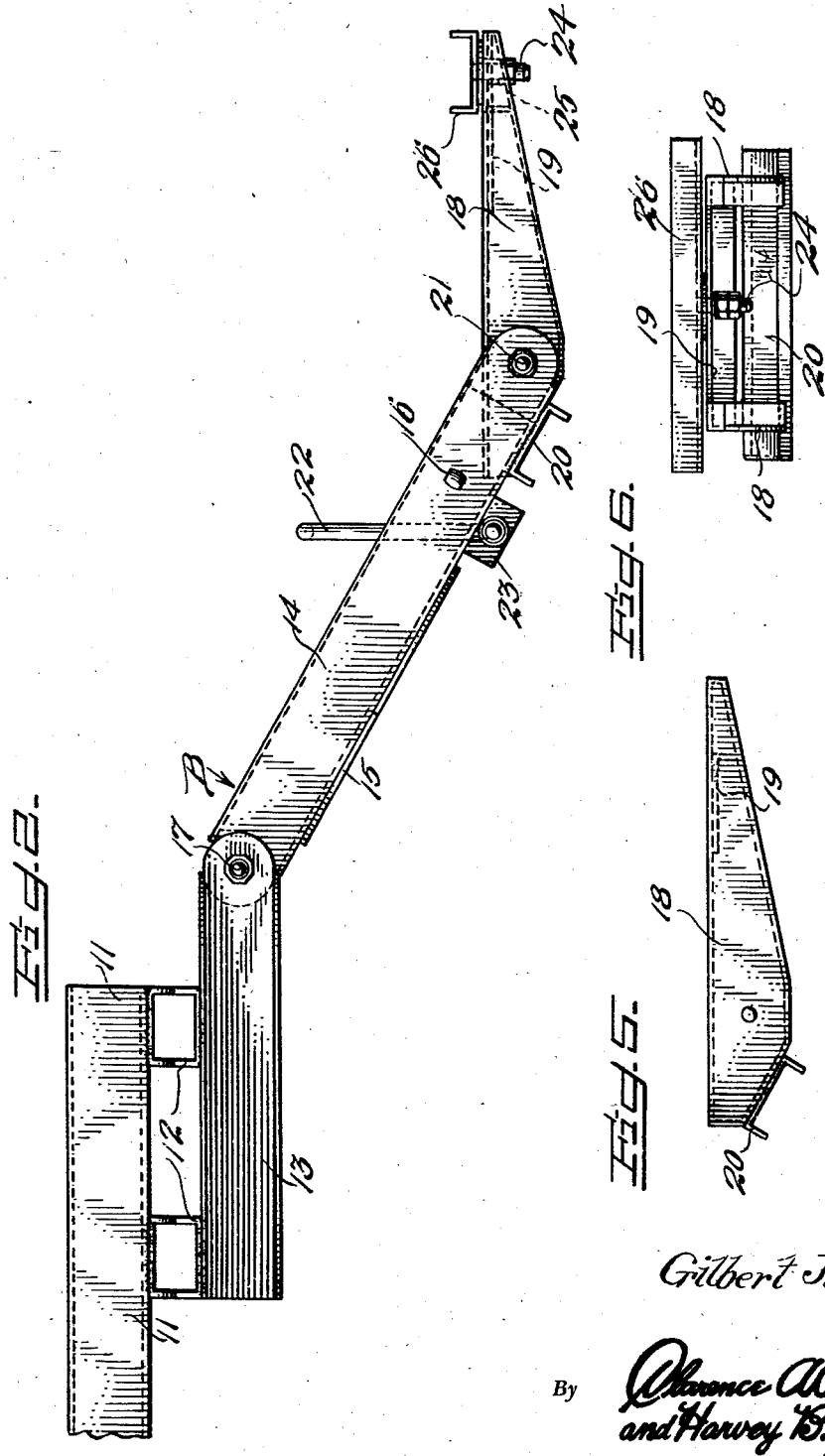

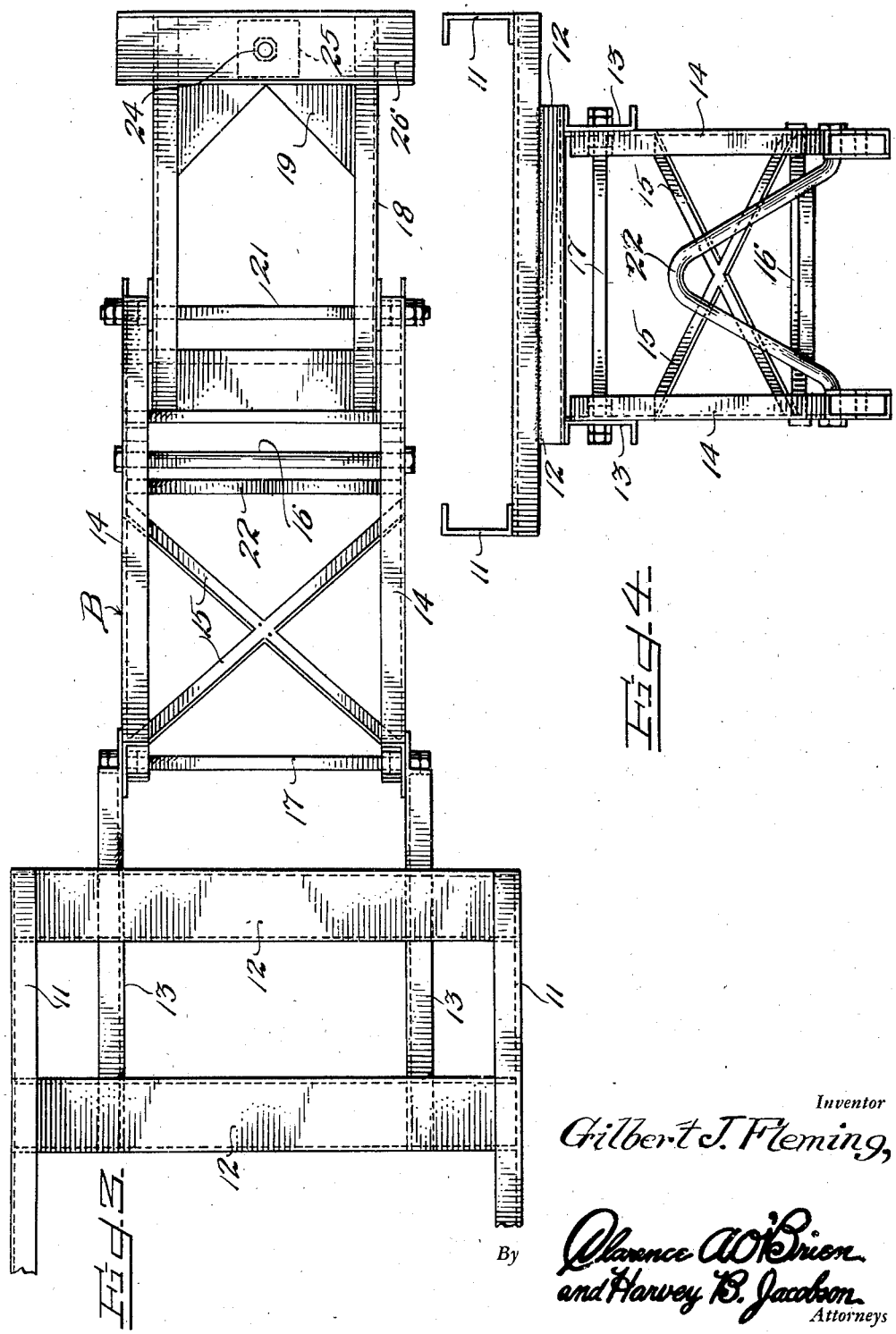

2,436,000

UNITED STATES PATENT OFFICE 2,436,000

TOWING APPARATUS

Gilbert J. Fleming, Marion, Ohio

Application November 8, 1945, Serial No. 627,445

4 Claims. (Cl. 214—86)

This invention relates to a towing apparatus for wrecked automobiles, and the primary object of the invention is to provide an apparatus of this kind which will effectively maintain the wrecked automobile in spaced relation to the towing truck, and which will permit the towing truck to assume different angular positions relative to the wrecked vehicle being towed when making turns.

A further object of the invention is to provide a towing apparatus of the above kind including a foldable boom projecting from the rear of the towing truck and engageable beneath the automobile to be towed, said boom being foldable to an upwardly swung position at the rear of the towing truck so as to not undesirably project rearwardly from the latter when not in use.

A still further object of the invention is to provide a towing apparatus of the above kind which is comparatively strong and durable in construction, simple, efficient in use, and easy and inexpensive to install and use.

The exact nature of the present invention will become apparent from the following description when considered in connection with the accompanying drawings, in which:

Figure 1 is a fragmentary side elevational view of a towing truck equipped with elements and parts to provide a towing apparatus constructed in accordance with the present invention, the apparatus being illustrated in use.

Figure 2 is an enlarged fragmentary side elevational view showing the foldable boom and its mounting.

Figure 3 is a top plan view of the construction shown in Figure 2.

Figure 4 is a rear elevational view of the construction shown in Figure 2, with the rear section of the foldable beam and its pivot bolt removed.

Figure 5 is a side elevational view of the rear section of the foldable boom with its swivelled channel removed, and Figure 6 is a rear elevational view of the rear section of the foldable boom.

Referring in detail to the drawings, 5 indicates the rear end portion of a towing truck having a hoisting mechanism mounted thereon including a winding drum 6, a rearwardly and upwardly extending inclined boom 7 provided at its rear upper end with guide pulleys 8, and a hoisting line 9 extending from the drum 6 rearwardly and upwardly over the pulleys 8 and provided at its free end with a hook 10. Thus far described, the construction may be conventional.

As shown more clearly in Figures 2, 3 and 4, the truck frame includes spaced longitudinal rails 11 which are connected at their rear ends by spaced parallel cross bars 12 in the form of built up rectangular tubes whose ends are welded to the under sides of the rails 11. Welded or otherwise secured to the under sides of the cross bars 12 between the rails 11 are spaced parallel longitudinally extending supporting bars 13 which project beyond the rearmost cross bar 12 and the rear end of the truck. The cross bars 12 and supporting bars 13 form the forward section of a folding boom B. This folding boom B further includes an intermediate section composed of spaced side bars 14 rigidly connected in spaced parallel relation by means of cross braces 15. In addition, the bars 14 are connected near their rear ends by a cross rod 16. The cross braces 15 are preferably welded where they cross each other and where their ends contact the under sides of the lower flanges of the bars 14. The intermediate boom section is pivoted at its forward end to the rear end of the forward fixed boom section by means of a transverse pivot bolt 17 that passes through the adjacent ends of the bars 13 and 14. It will be noted that the bars 14 of the intermediate boom section are so spaced that their forward ends are disposed at the inner sides of the bars 13.

The folding boom B includes a further rear section composed of spaced parallel side bars 18 rigidly connected at their forward ends by a plate 19 and at their rear ends by means of a cross bar 20. The plate 19 has its ends welded to the upper sides of the lower flanges of bars 18, and the bar 20 is welded to the under sides of the rear end portions of the bars 18 where the latter are cut at an angle. This disposes the bar 20 in a tilted position when the bars 18 are horizontal, for a purpose which will presently become apparent. The rear section of the boom B is pivoted to the rear end of the intermediate section by means of a transverse pivot bolt 21 that extends through the bars 14 and 18. The cross bar 20 is secured to the bars 18 rearwardly of the pivot 21 so as to be in position to engage the under sides of the forward ends of the bars 14 for limiting swinging movement of the rear section of the boom downwardly so that said rear boom section will be substantially horizontally disposed when the intermediate boom section is disposed at a predetermined rearward inclination as shown in Figure 1. The bar 20 acts as a stop or limiting means in this way because its ends project outwardly beyond the bars 18 to engage the bars 14 as stated. Bars 18 are disposed so that their forward ends are located at the inner sides of the rear ends of bars 14. It will thus be seen that the boom sections gradually decrease in width rearwardly. It will be further apparent that the boom B may be folded to an out of the way position at the rear of the truck 5 by swinging the intermediate boom section to a vertical position and swinging the rear boom section over onto the intermediate boom section as indicated by dotted lines in Figure 1. This avoids any dangerous projection of the boom beyond the rear end of the towing truck when the towing apparatus is not in use.

Pivoted to the intermediate boom section is a transverse bail 22 with which the hoisting hook 10 is adapted to be engaged for a purpose later described. The ends of this bail are journaled in brackets 23 secured to the under sides of the bars 14 of the intermediate boom section at a point between the cross rod 16 and the braces 15.

Swivelled at 24 in a bearing 25 supported by the plate 19 intermediate the forward ends of the bars 18 is a channel 26 adapted to be engaged beneath the axle or other suitable part of the vehicle to be towed. This acts as a fifth wheel construction which permits the towing truck to assume different angular positions relative to the towed automobile to facilitate making turns. The channel 26 acts as a receiving cradle for the automobile part, so that when the end of the towed vehicle is elevated by raising the foldable boom, the latter acts to maintain the towed vehicle in spaced relation to the rear end of the towing truck at all times.

In practice, the towing truck is backed to a position adjacent the desired end of the wrecked vehicle which is to be elevated when towing the latter. The towing truck is thus caused to assume a position so that the channel 26 may be engaged beneath the desired part of the vehicle at the end of the latter to be elevated. The hook 10 is then engaged with bail 22, and the hoisting line 9 is then wound upon the drum 6 so as to swing the intermediate and rear sections of the folding boom B upwardly, thereby elevating the engaged end of the towed vehicle. When the end of the towed vehicle is thus supported in raised position, the towing truck may be driven ahead so as to transport the wrecked automobile to the desired destination. By simply paying out on the hoisting line 9, the folding boom may be disengaged from beneath the towed vehicle after lowering the raised end of the latter. The towing truck may then be pulled forwardly so that the folding boom is clear of the towed vehicle, whereupon the line 9 may be wound upon drum 6 again so as to swing the boom upwardly to the out-of-the-way position shown by dotted lines in Figure 1. When this is done, the rear section of the folding boom is first folded on to the intermediate section thereof.

From the foregoing description, it is believed that the construction, operation and advantages of the present invention will be readily understood and appreciated by those skilled in the art. It will be apparent that the device is comparatively simple and durable, easy to operate, efficient in use and economical to manufacture and install. Minor changes may be made in details of construction such as fall within the scope of the invention as claimed.

What I claim as new is:

1. A towing boom for a towing truck having a hoisting mechanism mounted thereon including a rearwardly and upwardly extending inclined boom projecing beyond the rear of the truck and having guide pulleys at its rear upper end, and a hoisting line provided with a hoisting hook and extending over said pulleys, comprising a supporting section adapted to be rigidly secured to the underside of the rear end portion of the truck frame and to project beyond the rear end of the truck frame, an intermediate section pivoted to the rear end of said supporting section for vertical swinging movement and projecting rearwardly therefrom, a rear section pivoted to the rear end of the intermediate section for vertical swinging movement and projecting rearwardly therefrom, means to limit downward swinging movement of the rear section relative to the intermediate section to a position wherein the rear section may be horizontally disposed when the intermediate section is inclined rearwardly, a channel for engagement beneath the automobile to be towed, centrally swivelled on the rear end of the rear boom section for turning about a vertical axis relative to the latter, and means to connect the hoisting hook to the intermediate boom section.

2. A towing apparatus comprising, in combination with a towing truck having a hoisting mechanism mounted thereon, said hoisting mechanism including a rearwardly and upwardly extending inclined boom projecting beyond the rear of the truck and having guide pulleys at its rear upper end, and a hoisting line provided with a hoisting hook and extending over said pulleys, of a second boom including spaced supporting bars rigidly secured to the underside of the rear end portion of the truck frame and projecting beyond the rear of the truck, rigidly connected spaced arms pivoted to the rear ends of said supporting bars for vertical swinging movement and projecting rearwardly therefrom, further rigidly connected spaced arms pivoted to the rear ends of the first named arms for vertical swinging movement and projecting rearwardly therefrom, means to limit downwardly swinging movement of the further arms relative to said first named arms to a position whereby the further arms may be horizontally disposed when the first named arms are inclined rearwardly, and a channel for engagement beneath the automobile to be towed centrally swivelled between the rear ends of the second arms for turning about a vertical axis relative to the latter, and means to connect the hoisting hook to the first named arms.

3. A foldable hoisting boom for towing trucks comprising a forward section adapted to be rigidly secured to the rear end of the truck frame, an intermediate section hinged to the rear end of the forward section for vertical swinging movement, and a rear section hinged to the rear end of the intermediate section for vertical swinging movement, said rear section being foldable onto the intermediate section and the intermediate section being swingable upwardly to a vertical out of the way position at the rear of the truck, means to limit downward swinging movement of the rear section relative to the intermediate section, and a channel for engagement beneath the automobile to be towed centrally swivelled on the rear end of the rear section for turning about a vertical axis relative to the latter.

4. A foldable hoisting boom for towing trucks comprising a forward section adapted to be rigidly secured to the rear end of the truck frame, an intermediate section hinged to the rear end of the forward section for vertical swinging movement, and a rear section hinged to the rear end of the intermediate section for vertical swinging movement, said rear section being foldable onto the intermediate section and the intermediate section being swingable upwardly to a vertical out of the way position at the rear of the truck, means to limit downward swinging movement of the rear section relative to the intermediate section, and a channel for engagement beneath the automobile to be towed centrally swivelled on the rear end of the rear section for turning about a vertical axis relative to the latter, and means carried by the intermediate section to facilitate connection of a hoisting line thereto, said means to limit downward movement of the rear section including a cross-bar secured to the forward end of the rear section and projecting beyond the sides of the latter for engagement with the forward end portions of the intermediate section forwardly of the pivotal axis of said rear section.

GILBERT J. FLEMING.

REFERENCES CITED

The following references are of record in the file of this patent:

UNITED STATES PATENTS

| Number | Name | Date |
| --- | --- | --- |
| 1,517,547 | Ekberg | Dec. 2, 1924 |
| 1,520,194 | Matthews | Dec. 23, 1924 |
| 2,045,793 | Pearson et al. | June 30, 1936 |
| 2,090,819 | Thompson | Aug. 24, 1937 |
| 2,111,341 | Tetrault | Mar. 15, 1938 |
| 2,197,406 | Fleming et al. | Apr. 16, 1940 |